United States Patent
Schnitzer et al.

(10) Patent No.: US 11,940,535 B2
(45) Date of Patent: Mar. 26, 2024

(54) MULTI-PULSE LIDAR SYSTEM FOR MULTI-DIMENSIONAL DETECTION OF OBJECTS

(71) Applicant: Robert Bosch GmbH, Stuttgart (DE)

(72) Inventors: Reiner Schnitzer, Reutlingen (DE); Tobias Hipp, Hechingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 900 days.

(21) Appl. No.: 16/770,941

(22) PCT Filed: Dec. 17, 2018

(86) PCT No.: PCT/EP2018/085099
§ 371 (c)(1),
(2) Date: Aug. 7, 2020

(87) PCT Pub. No.: WO2019/121437
PCT Pub. Date: Jun. 27, 2019

(65) Prior Publication Data
US 2021/0181315 A1   Jun. 17, 2021

(30) Foreign Application Priority Data
Dec. 18, 2017   (DE) ...................... 10 2017 223 102.5

(51) Int. Cl.
*G01S 7/481* (2006.01)
*G01S 7/4863* (2020.01)
(Continued)

(52) U.S. Cl.
CPC ............ *G01S 17/89* (2013.01); *G01S 7/4816* (2013.01); *G01S 7/4863* (2013.01); *G01S 17/10* (2013.01); *G01S 17/931* (2020.01)

(58) Field of Classification Search
CPC ........ G01S 7/4863; G01S 17/89; G01S 17/09; G01S 7/4815; G01S 7/4817; G01S 17/935; G01S 7/4816
See application file for complete search history.

(56) References Cited

U.S. PATENT DOCUMENTS

2004/0151345 A1   8/2004   Morcom
2012/0075615 A1   3/2012   Niclass et al.
(Continued)

FOREIGN PATENT DOCUMENTS

CN   105043539 A   11/2015
CN   105066953 A   11/2015
(Continued)

OTHER PUBLICATIONS

Website https://dictionary.cambridge.org/us/dictionary/english/instantaneously, downloaded on Jul. 25, 2023.*
(Continued)

*Primary Examiner* — Eric L Bolda
(74) *Attorney, Agent, or Firm* — NORTON ROSE FULBRIGHT US LLP; Gerard A. Messina

(57) ABSTRACT

A multipulse LIDAR system, including: a transmitting device for generating a transmission laser beam from a temporal sequence of single laser pulses; a receiving device with a detection surface, including a subdetector system made up of multiple subdetectors, for receiving the transmission laser beam that is reflected/scattered on objects in an observation area, the receiving device imaging a sampling point on the detection surface in the form of a pixel; a scanning device generating a scanning movement for successive sampling of the observation area along multiple sampling points situated in succession, the scanning movement to image a pixel on the detection surface, in each case shifted along the subdetector system; and a control device for determining distance information of the sampling points (Continued)

based on propagation times of the particular single laser pulses, the control device grouping subdetectors to form a macropixel individually associated with the particular pixel, for shared evaluation.

9 Claims, 11 Drawing Sheets

(51) Int. Cl.
*G01S 17/10* (2020.01)
*G01S 17/89* (2020.01)
*G01S 17/931* (2020.01)

(56) References Cited

U.S. PATENT DOCUMENTS

| | | | | |
|---|---|---|---|---|
| 2013/0300838 A1* | 11/2013 | Borowski | ............ | G01S 7/4863 348/46 |
| 2017/0176579 A1 | 6/2017 | Niclass et al. | | |
| 2019/0109977 A1* | 4/2019 | Dutton | ............ | H04M 1/0202 |
| 2019/0369216 A1* | 12/2019 | Anderson | ............ | G01S 7/4863 |

FOREIGN PATENT DOCUMENTS

| | | |
|---|---|---|
| CN | 106461782 A | 2/2017 |
| CN | 106970393 A | 7/2017 |
| CN | 107003785 A | 8/2017 |
| DE | 102011005746 A | 9/2012 |
| EP | 2708914 A1 | 3/2014 |
| EP | 3318895 A1 | 5/2018 |
| JP | 2004157044 A | 6/2004 |
| JP | 2015078953 A | 4/2015 |
| WO | 2017132704 A1 | 8/2017 |

OTHER PUBLICATIONS

International Search Report dated Feb. 22, 2019 in connection with International Application No. PCT/EP2018/085099.

\* cited by examiner

MULTI-PULSE LIDAR SYSTEM FOR MULTI-DIMENSIONAL DETECTION OF OBJECTS

FIELD

The present invention relates to a multipulse LIDAR system for multidimensional detection of objects in an observation area of the multipulse LIDAR system. Moreover, the present invention relates to a method for multidimensional detection of objects in an observation area with the aid of such a multipulse LIDAR system.

BACKGROUND INFORMATION

LIDAR systems are used, among other things, for detecting objects in the surroundings of vehicles. Such a LIDAR system scans its surroundings with the aid of pulsed or time-modulated laser radiation, the light radiation that is emitted by a laser source of the LIDAR system being reflected or scattered on objects in the surroundings and once again received in the LIDAR system with the aid of a detector. During the scanning, the laser beam is successively moved along a scanning direction, and the objects situated in the observation area in question are detected. The relative position of a detected object in relation to the vehicle is ascertained via the corresponding angle of the laser beam and the distance information ascertained with the aid of propagation time measurement of the single laser pulses. The LIDAR system may be designed in the form of a single-pulse LIDAR system or a multipulse LIDAR system. A single-pulse LIDAR system samples each sampling point with the aid of a single laser pulse in each case. A particularly high lateral resolution may thus be achieved. However, the system requires single laser pulses having relatively high laser power, for which reason a correspondingly powerful laser source is required. In contrast, much less laser power is used in the multipulse LIDAR system, in which a sampling point is sampled with the aid of multiple low-power single laser pulses in quick succession. Summing the individual measurements results in a suitable detector signal with a satisfactory signal-to-noise ratio. However, one disadvantage of this method is a reduction in the lateral resolution resulting from summing the individual measurements over a relatively large angular range, and accompanying "smearing" of the detector signal.

SUMMARY

An object of the present invention, therefore, is to provide a laser-based detection method for objects which operates according to the principle of a multipulse LIDAR system and therefore manages with relatively low laser power, and at the same time allows a relatively high lateral resolution. This object may be achieved by a multipulse LIDAR system according to example embodiments of the present invention. Moreover, the object may be achieved by a method in accordance with example embodiments of the present invention. Further advantageous specific embodiments are described herein.

According to the present invention, a multipulse LIDAR system for detecting objects in an observation area is provided. In accordance with an example embodiment of the present invention, the LIDAR system includes a transmitting device with at least one laser source for generating a transmission laser beam from a temporal sequence of single laser pulses, each of which illuminates a detection area that is limited to a portion of the observation area and samples at least one sampling point. In addition, the LIDAR system includes a receiving device with a detection surface, including a linear or matrix-like subdetector system made up of multiple subdetectors, adjacently situated in a first direction of extension, for receiving the transmission laser beam, in the form of a reception laser beam, that is reflected and/or scattered on objects in the observation area of the multipulse LIDAR system. The receiving device is designed to image a sampling point, detected by the transmission laser beam, on the detection surface in the form of a pixel. In addition, the LIDAR system includes a scanning device for generating a scanning movement of the transmission laser beam in a scanning direction for successive sampling of the entire observation area along multiple sampling points situated in succession in the scanning direction. The scanning movement of the transmission laser beam, for single laser pulses in chronological succession, is designed to image a pixel on the detection surface, in each case shifted along the linear or matrix-like subdetector system. Lastly, the LIDAR system includes a control device for determining distance information of the sampling points based on propagation times of the particular single laser pulses, the control device being designed to jointly evaluate subdetectors, which are detected from a pixel that is instantaneously imaged on the detection surface, in the form of a macropixel that is individually associated with the particular pixel. Due to the option for individually associating subdetectors with a macropixel, the position of the particular macropixel may be optimally adapted to the position of the pixel that represents the imaging of the particular sampling point on the detection surface. Optimal use may thus be made of the measuring energy of the particular sampling point.

In one specific embodiment of the present invention, it is provided that the control device is also designed to adapt the position of a macropixel on the detection surface by regrouping corresponding subdetectors subsequent to the shift, caused by the scanning movement, of the pixel associated with the particular macropixel on the detection surface. Optimal use may thus be made of the measuring energy and measuring time for the particular sampling point over multiple individual measurements.

In another specific embodiment of the present invention, it is provided that the transmitting device is designed to generate a transmission laser beam whose single laser pulses each illuminate a solid angle with at least two sampling points. The receiving device is designed to represent the two sampling points in the sampling range, instantaneously illuminated by the transmission laser beam, in the form of two pixels that are adjacently situated on the detection surface and that are shifted along the linear or matrix-like subdetector system due to the scanning movement. In addition, the control device is designed to group subdetectors, instantaneously detected by a first pixel of the two pixels, together to form a first macropixel that is associated with the first pixel, and to group subdetectors, instantaneously detected by a second pixel of the two pixels, together to form a second macropixel that is associated with the second pixel. The measuring time for each of the two sampling points is increased due to the joint sampling of multiple sampling points. More measuring energy is thus available for each sampling, thereby improving the signal-to-noise ratio.

According to another specific embodiment of the present invention, control device 130 is designed to associate subdetectors, which are detected by the first pixel in a first individual measurement that takes place with the aid of a first single laser pulse, and by the second pixel in a second individual measurement that takes place with the aid of a second single laser pulse immediately following the first single laser pulse, with the first macropixel for the first individual measurement, and with the second macropixel for the subsequent second individual measurement. Optimal use is thus made of the detection surface.

In another specific embodiment of the present invention, it is provided that the transmitting device includes multiple laser sources whose detection areas are mutually orthogonal with respect to the scanning direction. The detection surface for each laser source includes a subdetector system that is individually associated with the particular laser source, the subdetector systems being mutually orthogonal with respect to the scanning direction. The vertical resolution of the LIDAR system may be increased in this way.

Moreover, according to the present invention, a method for multidimensional detection of objects in an observation area with the aid of a multipulse LIDAR system is provided. In accordance with an example embodiment of the present invention, a transmission laser beam in the form of a temporal sequence of single laser pulses is generated in a first method step, the transmission laser beam with each single laser pulse illuminating a detection area that is limited to a subsection of the observation area and that samples at least one sampling point. A scanning movement of the transmission laser beam in a scanning direction is subsequently generated, resulting in successive sampling of the entire observation area at multiple successive sampling points in the scanning direction. A reception laser beam that is generated by reflection and/or scattering of the transmission laser beam on objects in the observation area is subsequently received on a detection surface that includes a linear or matrix-like subdetector system made up of multiple subdetectors adjacently situated in a first direction of extension, a sampling point on the detection surface, instantaneously detected by the transmission laser beam, being imaged in the form of a pixel that is successively shifted along the linear or matrix-like subdetector system due to the scanning movement of the transmission laser. Subdetectors whose positions correspond to the instantaneous position of the pixel are subsequently grouped to form a macropixel that is individually associated with the particular pixel. Lastly, the subdetectors associated with the particular macropixel are jointly evaluated. Due to the option for individually grouping subdetectors to form a macropixel, the position of the particular macropixel may be optimally adapted to the position of the pixel that represents the imaging of the particular sampling point on the detection surface. Optimal use may thus be made of the measuring energy for the particular sampling point.

In one specific embodiment of the present invention, it is provided that the signals, measured in multiple individual measurements for a certain macropixel, of the subdetectors associated with the particular macropixel in these individual measurements are jointly associated with a histogram that is associated with the particular macropixel. The measuring time made up of the individual measurements is thus evaluated jointly, which in particular results in a better signal-to-noise ratio.

In another specific embodiment of the present invention, it is provided that the position of a macropixel on the detection surface is successively adapted by regrouping corresponding subdetectors subsequent to a shift of the pixel on the detection surface, associated with the particular macropixel, that is caused by the scanning movement. Optimal use may thus be made of the measuring energy and measuring time of the particular sampling point over multiple individual measurements.

In another specific embodiment of the present invention, it is provided that multiple sampling points are simultaneously detected during an individual measurement, subdetectors that are detected by a first pixel that is generated by a first sampling point on the detection surface being associated with a first macropixel that is individually associated with the first sampling point. In addition, subdetectors that are detected by a second pixel that is formed by a second sampling point on the detection surface are associated with a second macropixel that is individually associated with the second sampling point. The measuring time for each of the two sampling points is increased due to the joint sampling of multiple sampling points. More measuring energy is thus available for each sampling, thereby improving the signal-to-noise ratio.

Lastly, in another specific embodiment of the present invention, it is provided that subdetectors that are detected by the first pixel during a first individual measurement and detected by the second pixel in a second individual measurement that takes place with the aid of a second single laser pulse immediately following the first single laser pulse are associated with the first macropixel for the first individual measurement, and with the second macropixel for the subsequent second individual measurement. Particularly optimal use is thus made of the detection surface, which also allows a particularly flexible measurement.

Example embodiments of the present invention is described in greater detail below with reference to the figures.

DETAILED DESCRIPTION OF EXAMPLE EMBODIMENTS

The present invention makes possible a multipulse LIDAR system or macroscanner system which, despite use of multiple pulses for a measurement, achieves the same lateral resolution as a single-pulse LIDAR system. Since in a multipulse LIDAR system, a measurement is made up of multiple single pulses in order to improve the measuring accuracy or due to the use of special detectors or measuring principles (SPAD/TCSPC), the resolution of the system is limited for the measurement without suitable compensation for the angular difference between the emission of the first and the last single laser pulse.

To avoid this limitation, a row or an array made up of multiple small detectors or subdetectors is used instead of a single detector for receiving the measuring pulses. The rotational or scanning movement may be compensated for by suitably combining or grouping the subdetectors to form macropixels. The speed of the regrouping of the subdetectors results directly from the rotational speed of the sensor. The lateral resolution capability of such a design then corresponds to the resolution capability of a single-pulse approach. In addition, due to the parallel association of the single laser pulses with adjacent macropixels, no measuring energy or measuring time is lost.

In the LIDAR system according to an example embodiment of the present invention, an arrangement of multiple small detectors situated in a linear or matrix-like manner is used instead of a single detector for receiving individual measuring pulses. The rotational movement of the sensor head may be compensated for by suitably combining or regrouping these subdetectors to form larger macropixels. The speed of this regrouping of the subdetectors results directly from the rotational speed of the sensor. The lateral resolution capability of such a design corresponds to a single-pulse approach. Likewise, due to parallel association of the pulses with adjacent macropixels, no measuring energy or measuring time is lost. Detectors that operate according to various measuring principles, for example single photon avalanche photodiode (SPAD) or time-correlated single photon counting (TCSPC), may be used as subdetectors.

Figure 1:
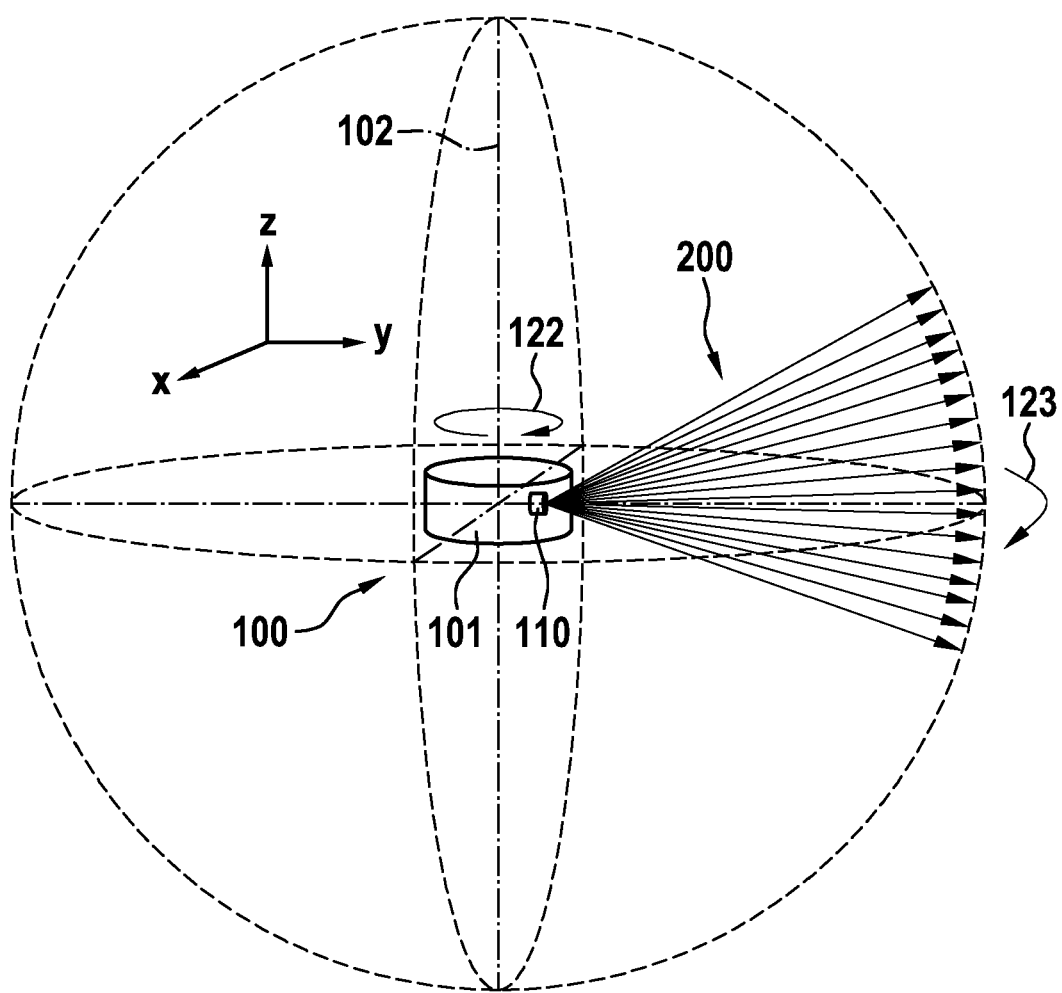
FIG. 1 schematically shows a perspective illustration of the multipulse LIDAR system for explaining the rotational movement for scanning the observation area.

FIG. 1 shows a macro LIDAR system 100 with a rotating sensor head 101 that includes multiple transmitting units and receiving units situated at different angles, in the present example only transmitting device 110 being illustrated. Sensor head 101 carries out a rotating scanning movement 122, rotational axis 102 extending in parallel to the Z axis in the present example. In this arrangement, the horizontal image resolution of the LIDAR system is determined by the rotational movement and the measuring rate. In contrast, the vertical image resolution is defined by the number and the particular angular distance of the receiving units. Sensor head 101 undergoes a complete revolution of 360° in the present exemplary embodiment. However, in each specific embodiment, the scanning movement may also be limited to a defined angular range.

Figure 2:
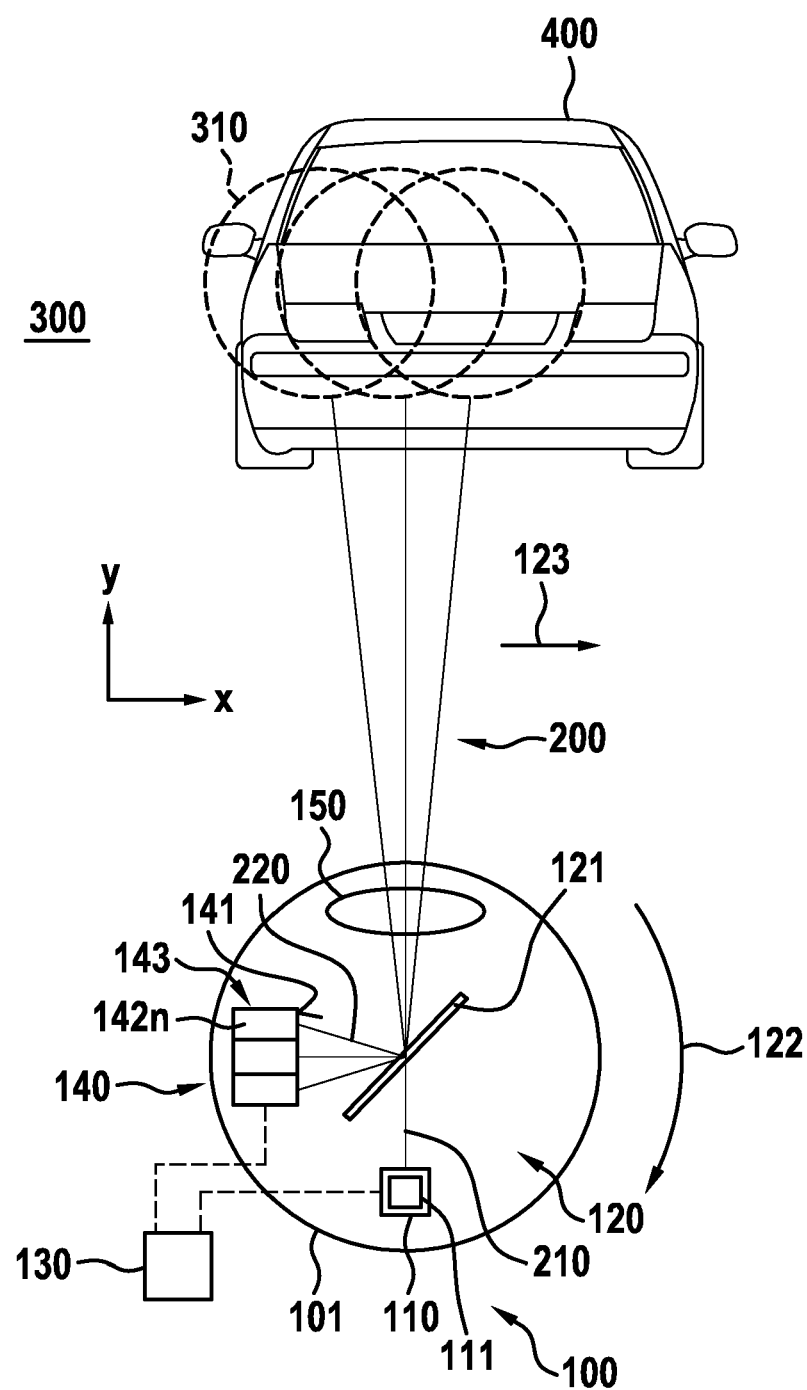
FIG. 2 shows a schematic illustration of a rotating LIDAR system during scanning of a vehicle that is situated in the observation area thereof.

FIG. 2 shows a schematic illustration of macro LIDAR system 100 from FIG. 1 during a scanning operation, in which an object 400 (in the present case, a vehicle) situated in observation area 300 of LIDAR system 100 is sampled with the aid of laser radiation 200. LIDAR system 100 includes a rotating sensor head 101 that includes a transmitting device 110 with at least one laser source 111, and a receiving device 140 with a detection surface 141. For each laser source, detection surface 141 includes a linear or matrix-like subdetector system 143 made up of multiple subdetectors $142_n$ adjacently situated in a first direction of extension 144. For reasons of clarity, only one linear subdetector system 143 including only three subdetectors $142_n$ is illustrated in FIG. 2.

In the present exemplary embodiment, sensor head 101 also includes an optical imaging device 150. This may involve, for example, one or multiple optical lens element(s) with the aid of which laser beams 210, 220 are shaped in the desired manner. In addition, as is the case in the present exemplary embodiment, sensor head 101 may include a beam splitter 121 for superimposing or separating transmission laser beams and reception laser beams 210, 220. Such an optical beam splitter 121 may be designed in the form of a semitransparent mirror, for example.

As also shown in FIG. 2, LIDAR system 100 typically also includes a control device 130 for controlling transmitting devices and receiving devices 110, 140. In the present example, control device 130 also includes a measuring device for ascertaining the propagation times of the emitted and received single laser pulses, as well as an evaluation device for ascertaining distance information of the sampling points based on the measured propagation times. Depending on the specific embodiment, control device 130 or its individual components may be situated outside sensor head 101 and connected to the particular devices in sensor head 101 with the aid of appropriate signal lines and data lines. Alternatively, control device 130 or its individual components may be accommodated within sensor head 101.

During operation of LIDAR system 100, each laser source of transmitting device 110 generates a dedicated transmission laser beam 210 in the form of a temporal sequence of brief single laser pulses. With each single laser pulse, transmission laser beam 210 illuminates a solid angle that defines detection area 310 of the particular single laser pulse, and that typically represents only a relatively small section of overall observation area 300 of LIDAR system 100. Sampling of overall observation area 300 is achieved only by rotating scanning movement 122 and the accompanying successive shift of detection areas 310 of successive single laser pulses. FIG. 2 illustrates, by way of example, a measuring sequence with three single laser pulses emitted in succession and their respective detection areas 310. Detection areas 310 are depicted by a dashed line. Instantaneous detection area 310 of transmission laser beam 210 is illustrated as a circle in the present exemplary embodiment. However, depending on the application, the cross section of transmission laser beam 210, which defines the shape of detection area 310, may also have some other design, for example elliptical or approximately square. Due to scanning movement 122 of sensor head 101, the individual single laser pulses are emitted at various angles, so that transmission laser beam 210 with its particular instantaneous detection area 310 migrates in predefined angular increments over object 400 that is sampled in each case. For the multipulse LIDAR system, the refresh rate of the single laser pulses and scanning movement 123 are in each case coordinated with one another in such a way that an area that is detected by transmission laser beam 210, and thus the sampling points (not shown here) situated in the particular area, are sampled by multiple single laser pulses in direct succession during a scanning pass.

As shown in FIG. 2, transmission laser beam 210 that is reflected on object 400 or scattered back from object 400 is received in the form of a reception laser beam 220 in sensor head 101 and imaged on detection surface 141. Due to scanning movement 122, a sampling point that is situated in instantaneous detection area 310 and that may be, for example, a detail of vehicle 400, is imaged on detection surface 141, shifted in each case by a defined distance, with successive laser pulses.

Figure 3:
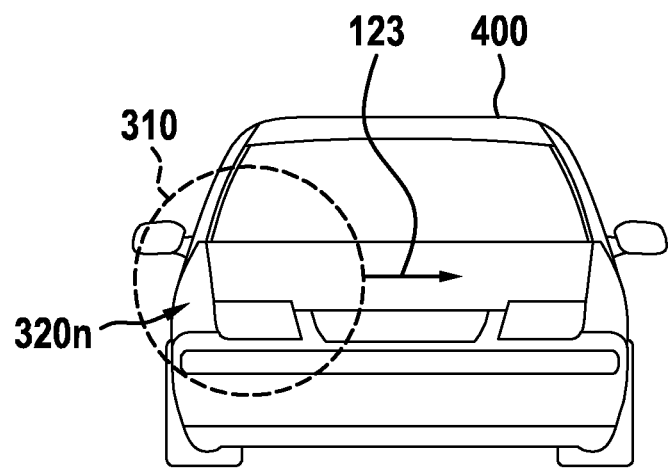
FIGS. 3 through 5 show schematic illustrations of the LIDAR system according to an example embodiment of the present invention for explaining the sampling operation of an object with the aid of three successive single laser pulses.
Figure 3:
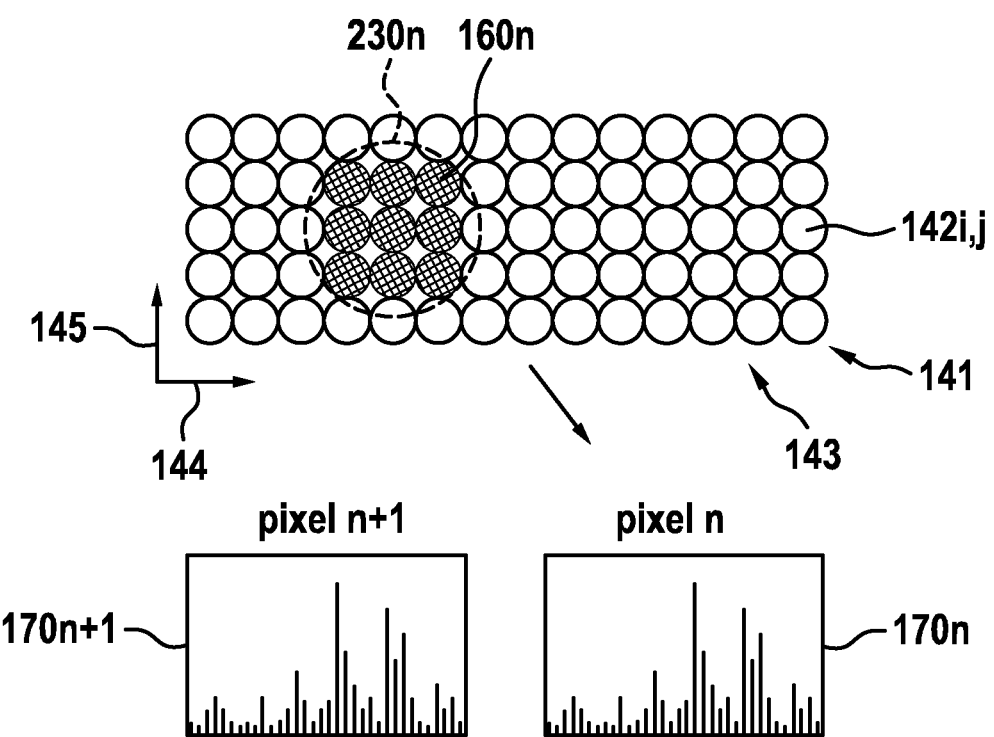
Figure 4:
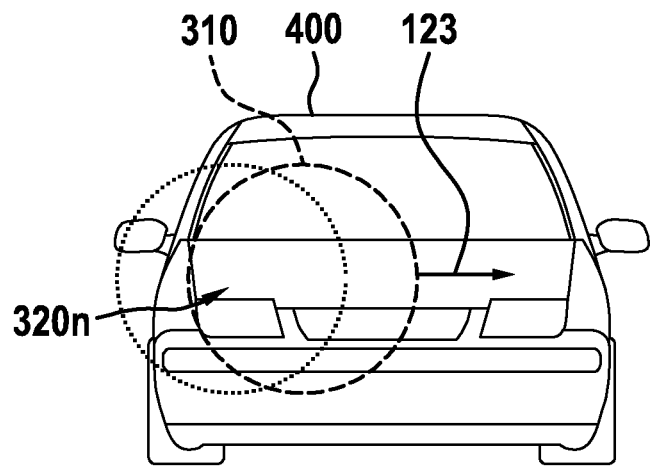
Figure 4:
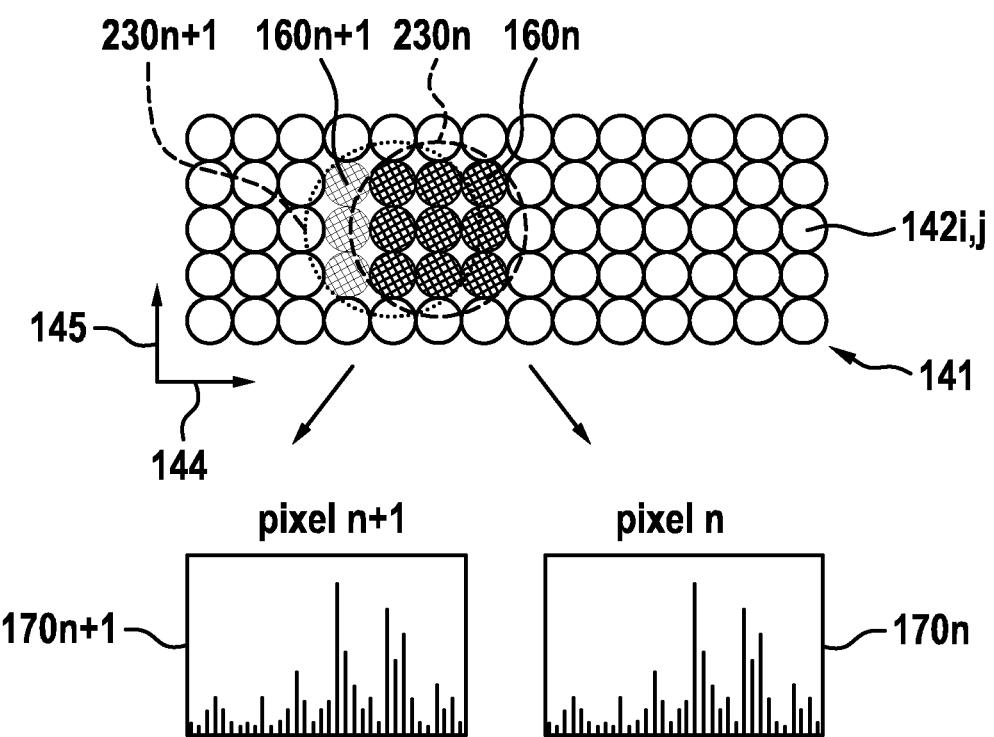
Figure 5:
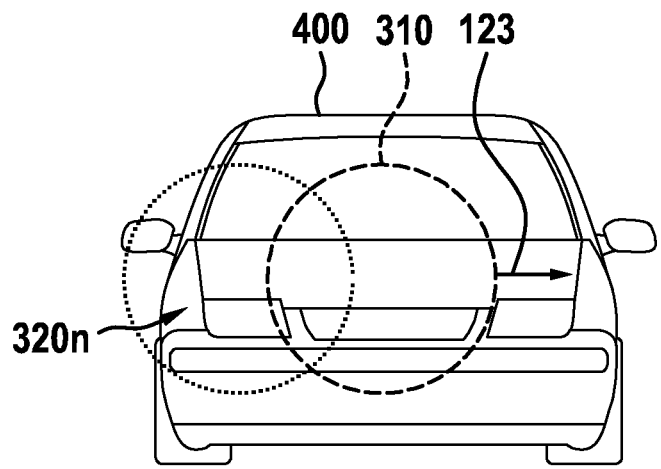
Figure 5:
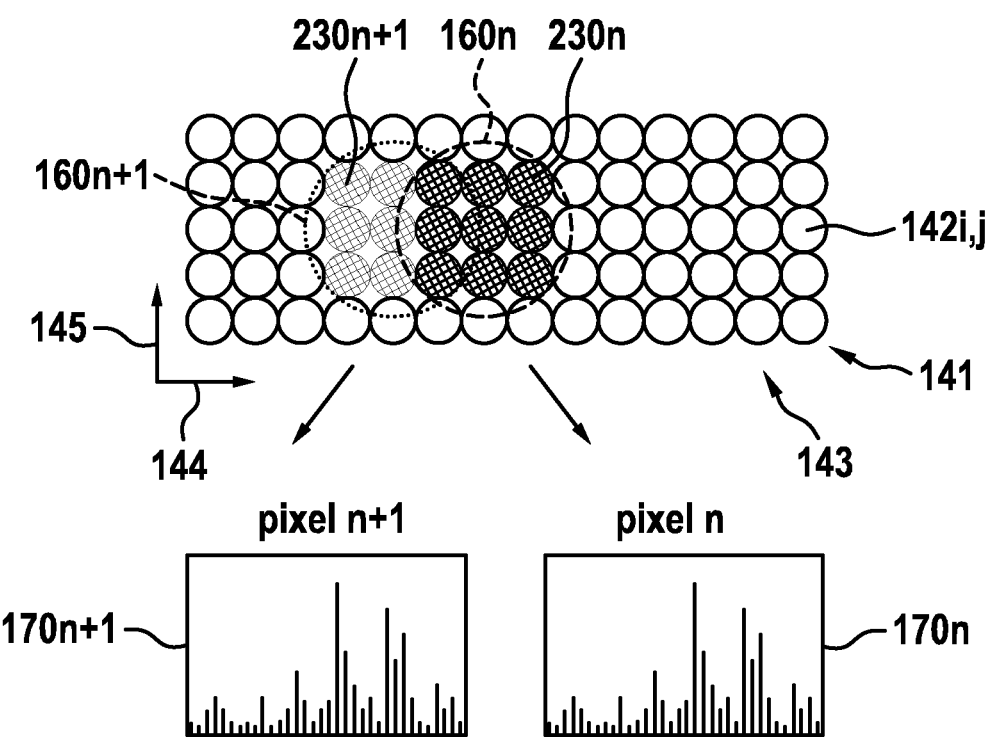

The regrouping of subdetectors, via which a shift of the macropixels on the detection surface, and thus a compensation of the rotating scanning movement, is achieved, is described in greater detail below. For this purpose, FIGS. 3 through 5 show the brief scanning sequence, already shown in FIG. 2, which includes the sampling of vehicle 400 with the aid of three single laser pulses. FIG. 3 shows a first individual measurement in which vehicle 400 is illuminated with the aid of a first single laser pulse. Instantaneous detection area 310 detects at least a first sampling point 320$_n$ that is imaged on detection surface 141 in the form of a corresponding pixel 230$_n$. Pixel 230$_n$, depicted by a dashed circle, illuminates a total of nine subdetectors 142$_{i,j}$ of matrix-like subdetector system 143, illustrated in dark crosshatch in FIG. 3. Subdetectors 142$_{i,j}$ in question are subsequently grouped to form a first macropixel 160$_n$ that represents first sampling point 320$_n$. The signals of grouped subdetectors 142$_{i,j}$ are jointly assigned to a histogram 170$_n$ that is associated with first macropixel 160$_n$. The signals of all subdetectors 142$_{i,j}$ associated with macropixel 160$_n$ during the overall measurement are added in this histogram 170$_n$. The signal-to-noise ratio may be improved in this way.

In contrast to FIG. 2, in the present exemplary embodiment, detection surface 141 includes a matrix-like subdetector system 143, which in a first direction of extension 144 includes a total of fourteen adjacently situated subdetectors 142$_{i,j}$, and in a second direction of extension 145 includes a total of five subdetectors 142$_{i,j}$ situated in succession.

In the stage of the method shown in FIG. 4, transmission laser beam 210 is migrated further in scanning direction 123 due to scanning movement 122. The instantaneous emitted second single laser pulse therefore includes a detection area 310 that is shifted by a certain angular extent in scanning direction 123. As a result, the projection of first sampling point 320$_n$ and thus the position of first pixel 230$_n$ on detection surface 141 are also shifted by a defined amount. The shift of pixel 230$_n$ is a direct function of the imaging properties of the optical components as well as of the particular angular difference between the individual measurements, and thus, of scanning speed 122 and the measuring rate. In the present exemplary embodiment, these parameters are coordinated with one another in such a way that in successive individual measurements, sampling point 320$_n$ is imaged on the detection surface, in each case shifted by a distance that preferably corresponds exactly to the lateral width of subdetectors 142$_{i,j}$. This ensures that subdetectors 142$_{i,j}$ may always be unambiguously associated with one of macropixels 160$_n$. This also applies for specific embodiments in which the increments with which the pixels are imaged on the detection surface, shifted in subsequent individual measurements, are an integral multiple of the lateral width of subdetectors 142$_{i,j}$. However, depending on the particular application, the parameters in question of the LIDAR system may also be such that the increments with which the pixels are imaged on the detection surface, shifted in subsequent individual measurements, are in each case a fraction of the lateral width of the subdetectors. In addition, LIDAR systems may also be implemented in which the shift of the pixels on the detection surface is not in a rational ratio with the lateral width of subdetectors 142$_{i,j}$. This is possible in particular when directly adjacent sampling points are imaged on the detection surface at a distance that corresponds at least to the width of a subdetector.

As shown in FIG. 4, the shift of first pixel 230$_n$ on detection surface 141 due to scanning movement 122 has been compensated for by a corresponding shift of first macropixel 160$_n$ associated with first pixel 230$_n$. The shift of first macropixel 160$_n$ takes place due to a regrouping of subdetectors 142$_{i,j}$ in question. For this purpose, three new subdetectors 142$_{i,j}$ have now been assigned to first macropixel 160$_n$ on its right side. In contrast, the three subdetectors 142$_{i,j}$ in light crosshatch in FIG. 4, which in the preceding individual measurement were still associated with first macropixel 160, are now associated with subsequent second macropixel 160$_{n+1}$, which in a manner of speaking moves from the left into the active portion of subdetector system 143. The signals of subdetectors 142$_n$, in dark crosshatch are assigned to histogram 170$_n$ of first macropixel 160$_n$, and the signals of subdetectors 142$_{i,j}$ in light crosshatch are assigned to histogram 170$_{n+1}$ of second macropixel 160$_{n+1}$, depending on their respective associations.

FIG. 5 shows a stage of the method during the third individual measurement, which directly follows the second individual measurement illustrated in FIG. 4. The transmission laser beam is migrated to the right by a further angular extent due to the scanning movement, so that associated detection area 310 is now migrated further with respect to the first individual measurement shown in FIG. 3. Since the relative position of first sampling point 320$_n$ has changed in relation to instantaneous detection area 310, first sampling point 320$_n$ is now imaged on detection surface 141, shifted by a corresponding amount. As is apparent from FIG. 5, the overall shift of first pixel 230$_n$ compared to the situation from FIG. 3 is now twice the lateral width of subdetectors 142$_{i,j}$. Similarly, the position of associated first macropixel 160$_n$ has also been changed by regrouping corresponding subdetectors 142$_{i,j}$ subsequent to the position of first pixel 230$_n$. In comparison to the arrangement from FIG. 4, three new subdetectors 142$_{i,j}$ have been assigned to first macropixel 160$_n$ on its right side. Similarly, the three subdetectors 142$_{i,j}$ depicted in light crosshatch in FIG. 5, which in the preceding individual measurement were still associated with first macropixel 160$_n$, are now associated with subsequent second macropixel 160$_{n+1}$. As a result, the signals of all subdetectors 142$_{i,j}$ associated with one of macropixels 160$_n$, 160$_{n+1}$ are respectively assigned to histogram 170$_n$, 170$_{n+1}$ of macropixel 160$_n$, 160$_{n+1}$ in question within the scope of the instantaneous individual measurement.

Figure 6:
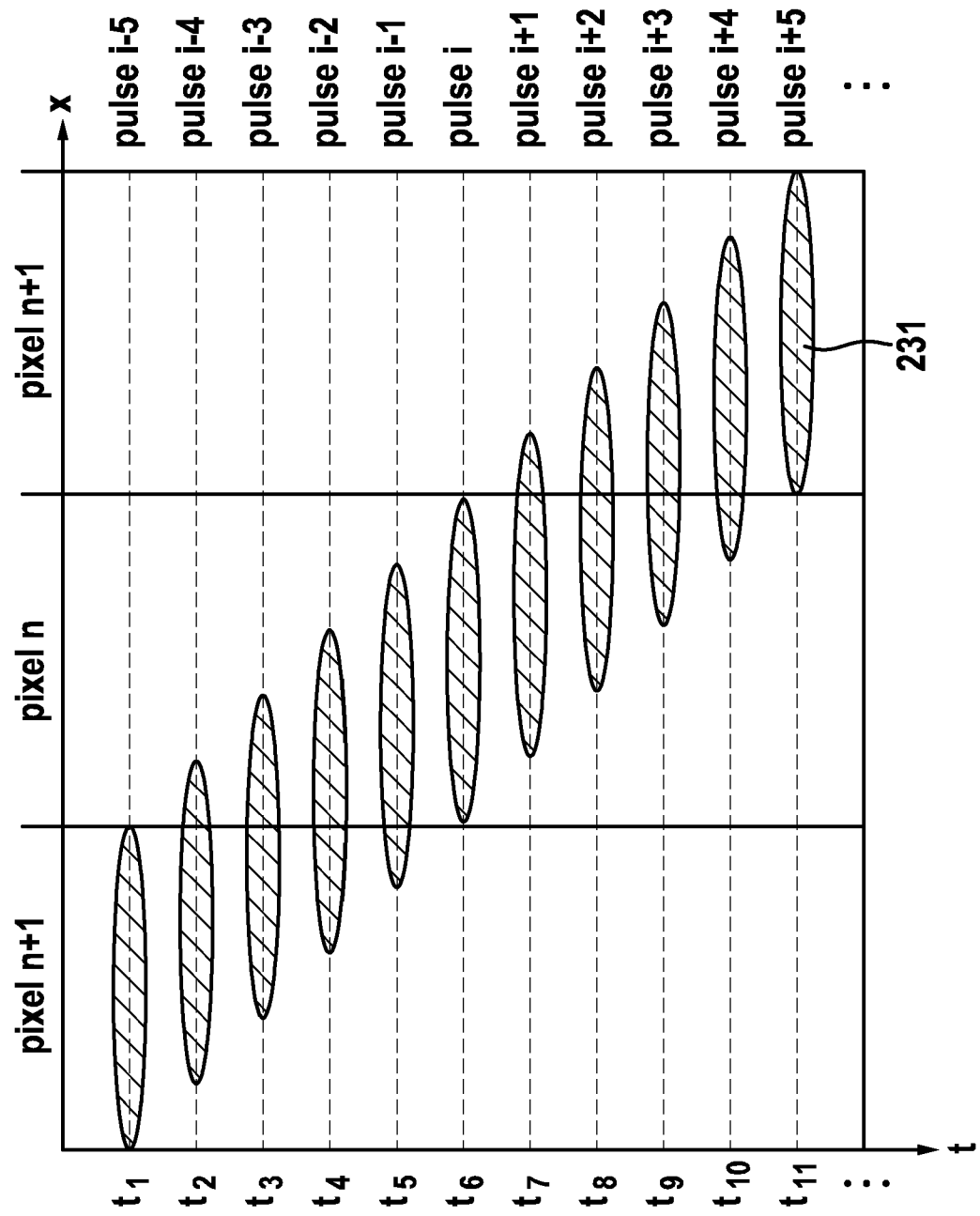
FIG. 6 shows a diagram for explaining the shift of a pixel, imaged on the detection surface, as a function of the scanning movement.

FIG. 6 shows a time diagram which depicts how subdetectors 142$_{i,j}$ of detection surface 141 are individually associated with various macropixels 160$_n$ in the course of a scanning operation. An ellipsoidal light spot 231 is illustrated, which is generated by the imaging of reception laser beam 220 on detection surface 141. Light spot 231 extends over the entire active portion of detection surface 141, which in the present case includes only five subdetectors 142$_{i,j}$ for purposes of explanation. During a scanning operation, in which transmission laser beam 210 is successively guided over successive sampling points due to the scanning movement, the sampling points in question are successively imaged on detection surface 141 in the form of pixels. The scanning movement thus results in the impression that the pixels, and thus the macropixels associated with them in each case, are migrating across detection surface 141. In contrast, viewed from the perspective of the macropixels, the impression results that light spot 231, which extends on detection surface 141 over the above-mentioned group of five subdetectors 142$_{i,j}$ in total, successively moves across a row of adjacently situated macropixels 160$_n$. This apparent movement of light spot 231 over a group of three successive macropixels in total is illustrated in the time diagram in FIG. 6. It is apparent that at point in time $t_6$, all subdetectors 142$_{i,j}$ of the group in question are associated with the middle macropixel (pixel n). For the subsequent single laser pulse (pixel n+1) at point in time $t_7$, of the group in question only four of the subdetectors 142$_{i,j}$ are now associated with the middle macropixel (pixel n), while one of subdetectors 142$_{i,j}$ of the group is already associated with the right of the three illustrated macropixels (pixel n+1). For a further single laser pulse (pulse i+2) at point in time $t_8$, two of the subdetectors 142$_{i,j}$ of the group in question are already associated with the right macropixel (pixel n+2). In this way, for each single laser pulse, light spot 231 migrates by one subdetector in each case over the three macropixels (pixel n−1, pixel n, pixel n+1) illustrated here. It is thus apparent from the diagram that a subdetector $142_{i,j}$, which is associated with a first macropixel during a first single laser pulse, is associated with a second macropixel following the first macropixel, no later than five further single laser pulses.

Figure 7:
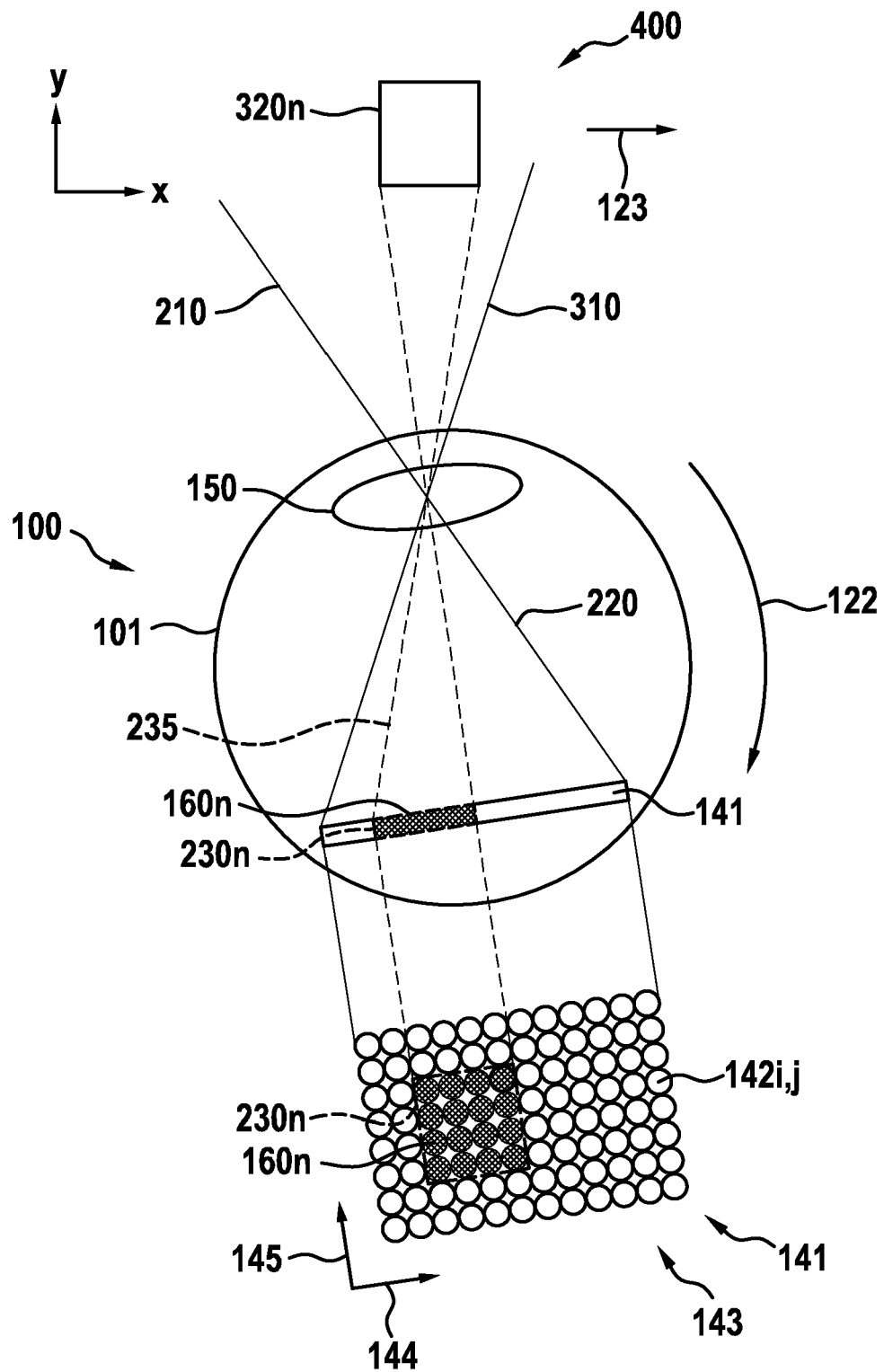
FIGS. 7 through 9 show a schematic illustration of a sampling operation for an object for explaining the association of subdetectors with individual macropixels.
Figure 8:
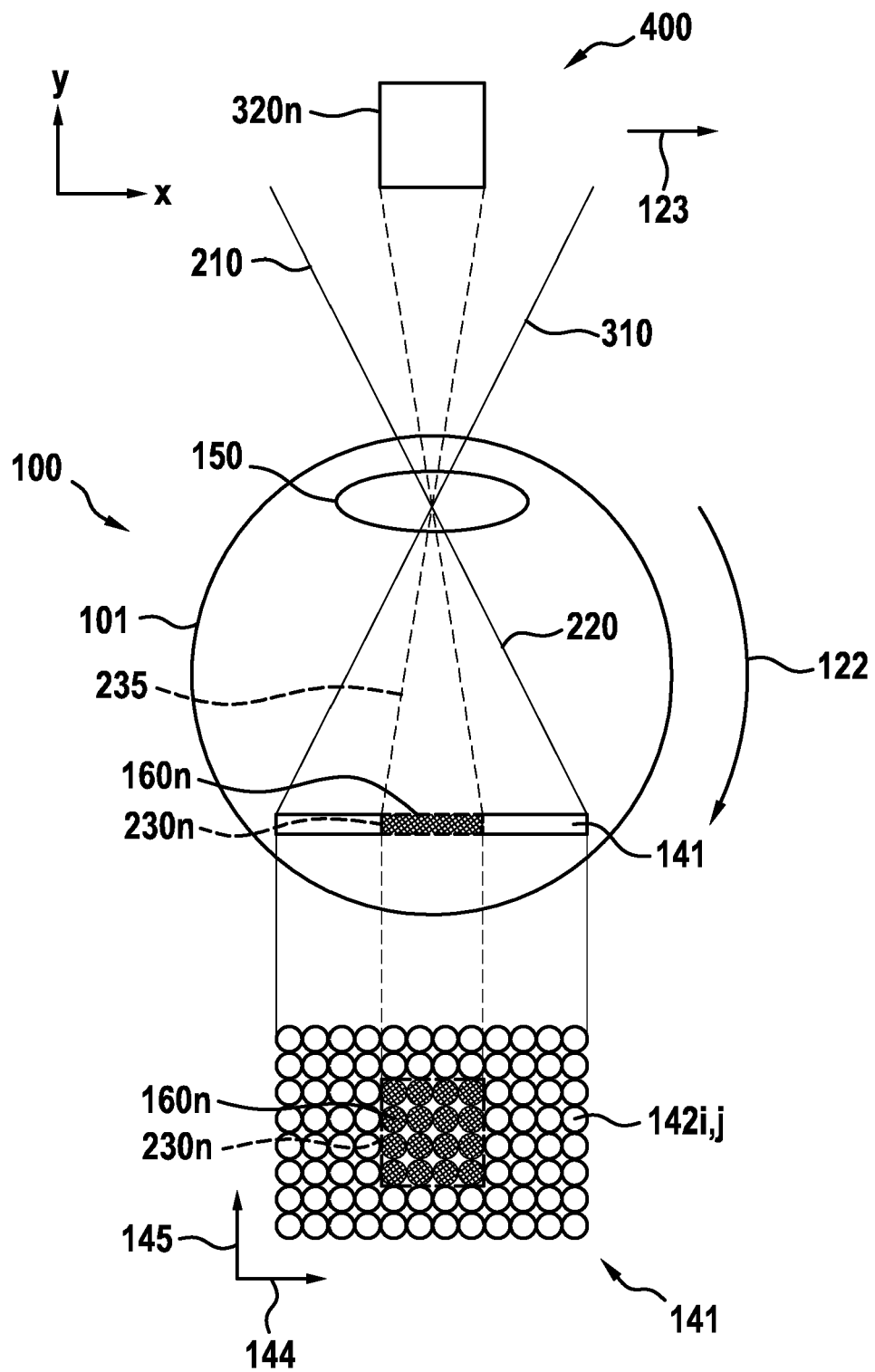
Figure 9:
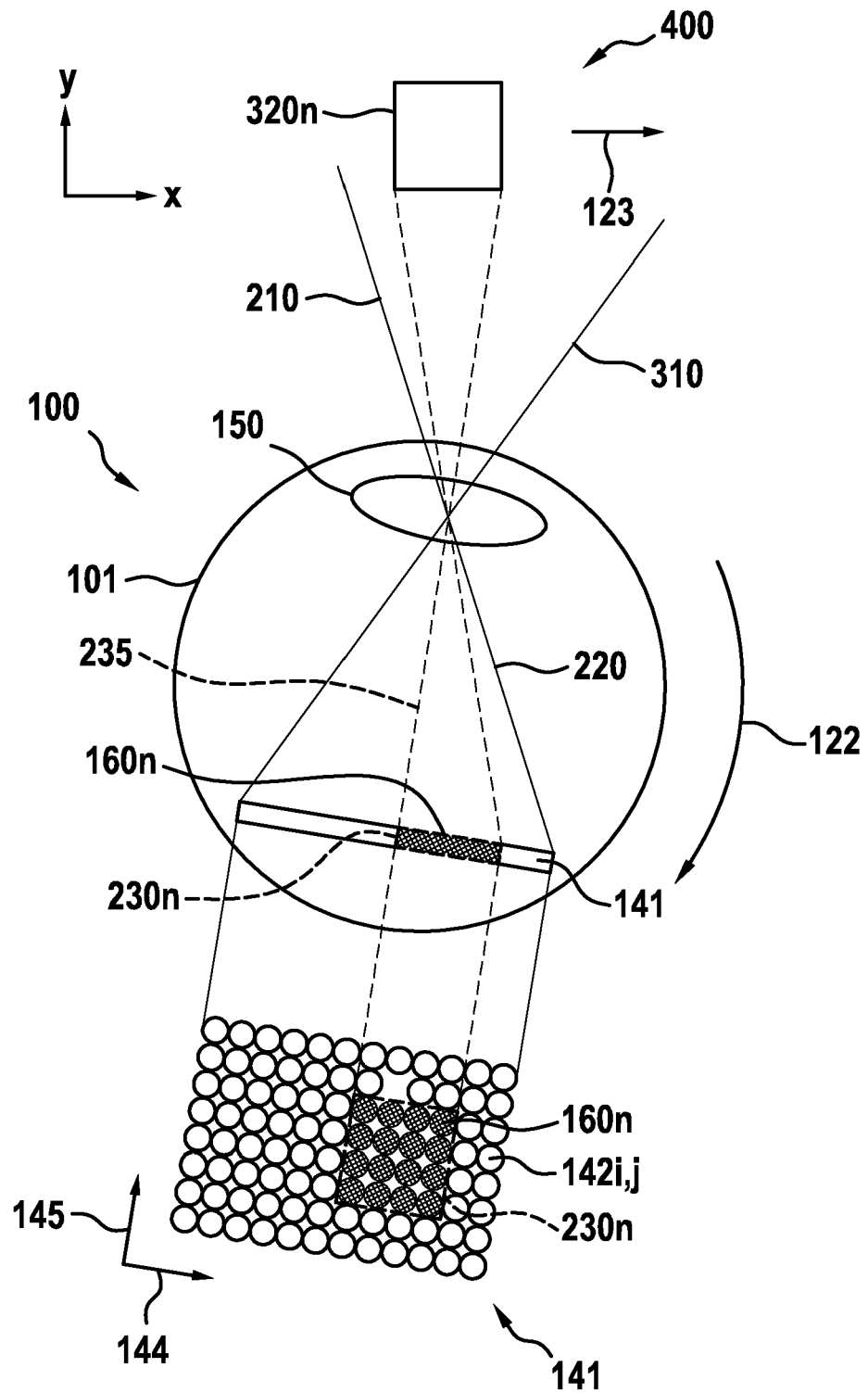

The relationship between the rotating scanning movement and the shift of a pixel on the detection surface is explained below. For this purpose, FIGS. 7 through 9 show a sequence of the scanning operation that includes three individual measurements. A simplified specific embodiment of sensor head 101 is illustrated in each case, laser beams 235 being imaged directly on detection surface 141 with the aid of an optical imaging device 150, without deflection by a beam splitter. As shown in FIG. 7, the emitted transmission laser beam with its conical detection area 310 detects an object 400 that is instantaneously situated in the viewing area of sensor head 101. Detected object 400 is sampled at a certain sampling point $320_n$. Sampling point $320_n$ is defined by a certain solid angle, which in the present exemplary embodiment is much smaller than the solid angle that defines detection area 110. The transmission laser beam is reflected back on object 400 and is received again in the form of a reception laser beam by sensor head 101 of LIDAR system 100. Sampling point $320_n$ associated with object 400 is imaged in the form of a pixel $230_n$ on detection surface 141. For better clarity, detection surface 141, which in the present exemplary embodiment is designed as a two-dimensional subdetector system 143 in the form of a 12×8 matrix, is illustrated in both the side view and top view.

As is shown in FIG. 7, the total of sixteen subdetectors $142_{i,j}$ in the present example detected by instantaneous pixel $230_n$, depicted in dark crosshatch in FIG. 7, are grouped to form a macropixel $160_n$ that is associated with the particular pixel. The grouping takes place by interconnecting the subdetectors, the signals detected by individual subdetectors $142_{i,j}$ being summed to form a shared histogram.

FIG. 8 shows the arrangement from FIG. 7 during the subsequent second individual measurement. Transmission laser beam 210 is migrated further in scanning direction 123 due to scanning movement 122. Detection area 310 of the instantaneous single laser pulse is thus shifted by a certain angular extent in scanning direction 123. Since sampling point $320_n$ is instantaneously situated in the center of detection area 310, first pixel $230_n$, which represents the projection of first sampling point $320_n$, is also imaged centrally on detection surface 141. Compared to the preceding individual measurement, first pixel $230_n$ on detection surface 141 has a shift by a defined distance in first direction of extension 144, which in the present case corresponds to twice the lateral width of the subdetectors. To compensate for the shift of pixel $230_n$ on detection surface 141 caused by scanning movement 122 of sensor head 101, the control device of LIDAR system 100 also shifts the position of macropixel $160_n$ associated with pixel $230_n$ by the particular distance by activating and deactivating appropriate subdetectors.

FIG. 9 shows the arrangement from FIGS. 7 and 8 during the subsequent third individual measurement. Due to scanning movement 122 of sensor head 101, transmission laser beam 210 and thus also its detection area 310 are further migrated in scanning direction 123 by the same angular extent as before. Thus, from the perspective of sensor head 101, sampling point $320_n$ is shifted further to the left by the corresponding angular extent. Consequently, first pixel $230_n$ is migrated on the detection surface to the right in first direction of extension 144 by twice the lateral width of subdetectors $142_{i,j}$. Associated first macropixel $160_n$ has also been shifted to the right by two subdetectors $142_{i,j}$ by regrouping corresponding subdetectors $142_{i,j}$ subsequent to first pixel $230_n$.

Figure 10:
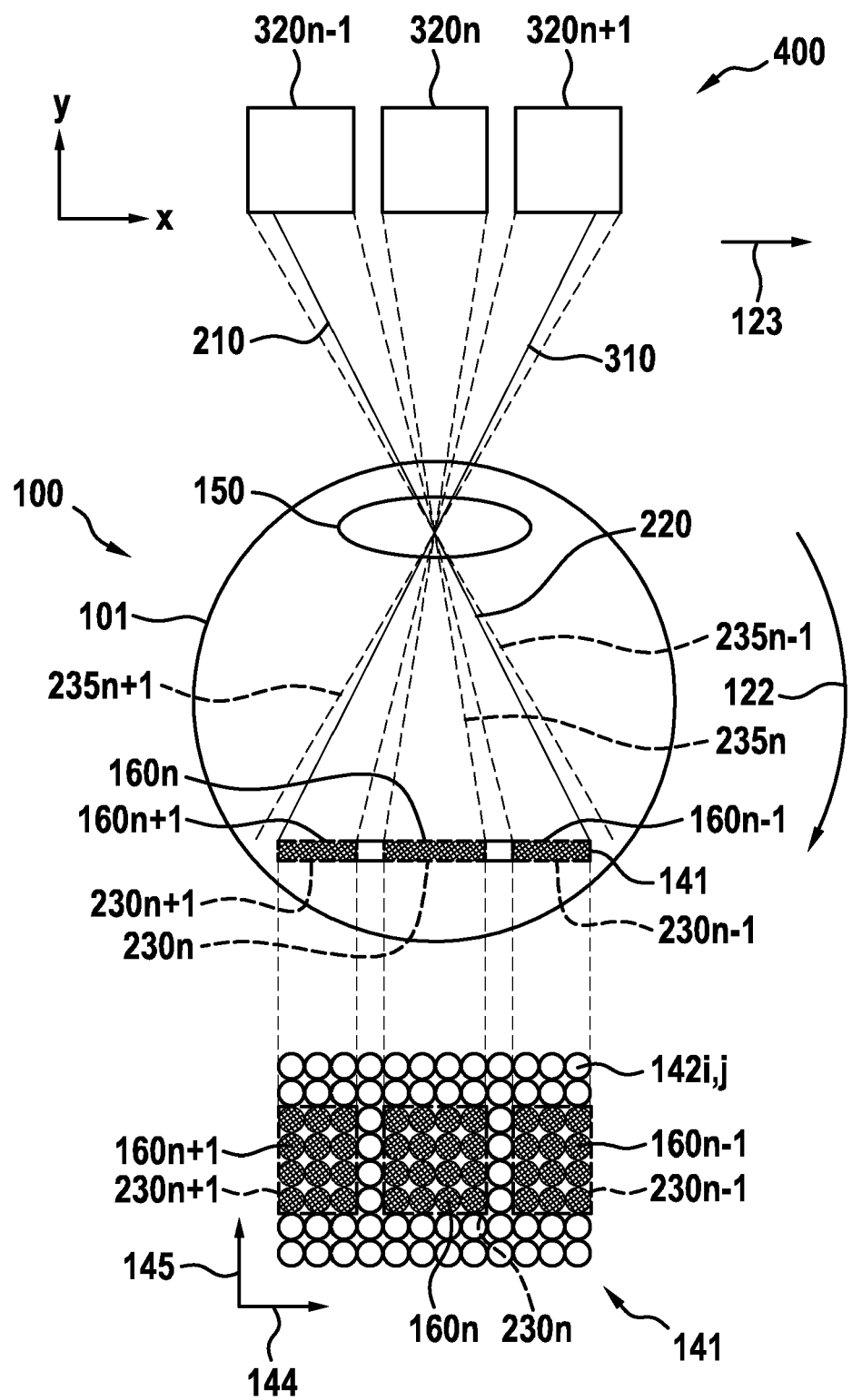
FIGS. 10 and 11 show a variation of the LIDAR system according to the present invention from FIGS. 7 through 9, with three sampling points simultaneously detected.
Figure 11:
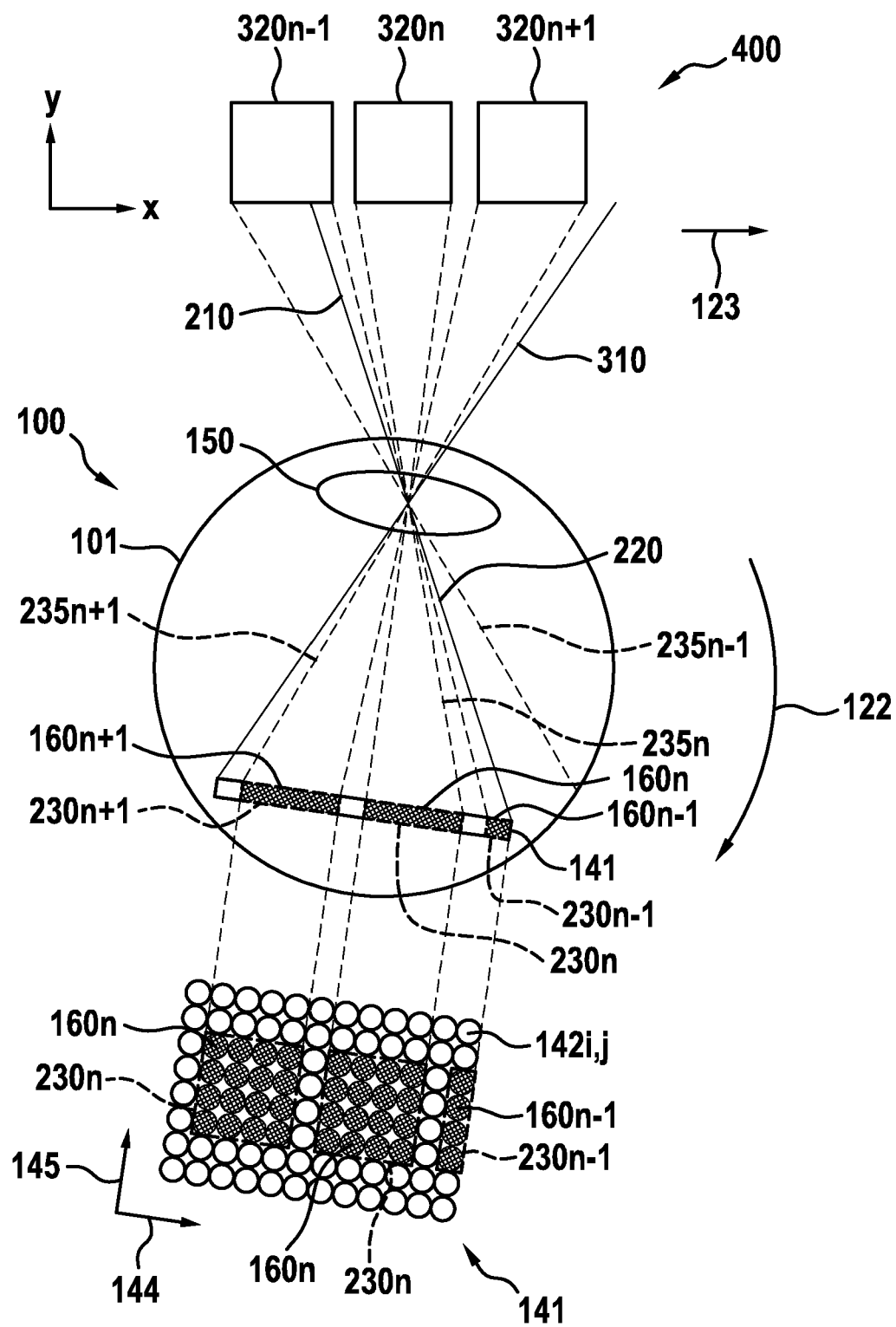

FIGS. 10 and 11 show another specific embodiment in which multiple laterally adjacent sampling points are simultaneously sampled with each single laser pulse. The measuring arrangement corresponds essentially to the arrangement from FIGS. 7 through 9. As is apparent from FIG. 10, detection area 310 of transmission laser beam 210 includes a total of three sampling points $320_{n-1}$, $320_n$, $320_{n+1}$ adjacently situated in scanning direction 123. Only middle sampling point $320_n$ is completely detected, while the two outer sampling points $320_{n-1}$, $320_{n+1}$ are not completely situated in instantaneous detection area 310. The three sampling points $320_{n-1}$, $320_n$, $320_{n+1}$ are imaged on various areas of detection surface 141. Three macropixels $160_n$, $160_{n+1}$ associated with respective sampling points $320_{n-1}$, $320_n$, $320_{n+1}$ are simultaneously generated on detection surface 141 by activating and grouping corresponding subdetectors $142_{i,j}$, each macropixel including sixteen subdetectors $142_{i,j}$ and in each case being separated from one another by a column of subdetectors. FIG. 11 shows the arrangement from FIG. 10 during a subsequent second individual measurement. As is apparent, transmission laser beam 210 and thus also its instantaneous detection area 310 are migrated further in scanning direction 123 by a defined angular extent due to scanning movement 122. From the viewpoint of sensor head 101, the three sampling points $320_{n-1}$, $320_n$, $320_{n+1}$ are shifted to the left, opposite scanning direction 123, by the same angular extent, left sampling point $320_{n-1}$ having almost completely exited from detection area 110, while right sampling point $320_{n+1}$ now having completely entered into detection area 310. Pixels $230_{n-1}$, $230_n$, $230_{n+1}$ generated by projections $235_{n-1}$, $235_n$, $235_{n+1}$ of the sampling points have been correspondingly shifted on detection surface 141 by a distance that corresponds to twice the lateral width of a subdetector. To compensate for this shift, macropixels $160_n$, $160_{n+1}$ associated with respective pixels $230_{n-1}$, $230_n$, $230_{n+1}$ have also been shifted by twice the lateral width of a subdetector by regrouping corresponding subdetectors $142_{i,j}$. As is apparent from a comparison of FIGS. 10 and 11, for shifting middle macropixel $160_n$ on detection surface 141, a first vertical row of four subdetectors whose subdetectors were previously situated to the right of middle macropixel $160_n$ and deactivated, as well as a second vertical row of four subdetectors whose subdetectors were previously associated with right macropixel $160_{n-1}$, are associated with middle macropixel $160_n$. In addition, on the left side of middle macropixel $160_n$, two vertical rows of four subdetectors each, previously associated with first macropixel $160_n$, are deactivated.

In contrast to the measuring arrangement in FIGS. 3 through 5, in which laterally adjacent sampling points directly adjoin one another, in the present exemplary embodiment the sampling points are spaced a small distance apart. This distance allows a sharper separation of the individual sampling points or the associated macropixels from one another. This distance may be smaller or larger, depending on the specific embodiment. When the scanning speed, the measuring rate, and the imaging properties of the optical components are coordinated with one another in such a way that the shift of the sampling points for directly successive individual measurements preferably corresponds exactly to the distance between the subdetectors on the detection surface or to an integral multiple of this distance, even sampling points without such a distance or with only a marginally small distance from one another may be implemented. Particularly high lateral image resolution may thus be achieved.

If the subdetectors have to be initially activated prior to each reception, it is meaningful for the grouping and activation of the subdetectors in question to take place in each case just before the reflected or backscattered single laser pulse strikes the detection surface. For subdetectors which may detect without a significant delay and which may thus operate quasi-continuously, the grouping of the subdetectors in question to form macropixels may optionally also take place during or even shortly after the particular individual measurement.

The basic design of the present invention is in accordance with conventional macro LIDAR scanners. However, whereas conventional scanners use a single detector for each vertical plane, in the scanner according to the present invention an arrangement of subdetectors that extends in the rotational plane, for example a subdetector row or a subdetector array (matrix-like arrangement of subdetectors), is used. The individual subdetectors of the subdetector system may be individually associated to form macrodetectors. FIGS. 3 through 5 show by way of example the sequence of a measurement made up of a number of "N" single laser pulses. At the point in time of the first pulse emission, the subdetectors in dark crosshatch in FIG. 3 are associated with a first macropixel $160_n$. The imaging of the received single laser pulse is assumed to be centered on first macropixel $160_n$. The imaging of the single laser pulse at a defined speed will move over the two-dimensional subdetector system as a function of the rotational speed of sensor head 101. In FIG. 4, first macropixel $160_n$ is depicted in dark crosshatch after a shift of exactly one subdetector, while the original position of first macropixel $160_n$ is indicated by a circle depicted with a dotted line. If the macropixel is now divided as indicated, the spatial resolution for first macropixel $160_n$ is maintained, while the pulse energy received from the subdetectors in light crosshatch, and thus also the measuring time for subsequent second macropixel $160_{n+1}$, are utilized. This approach thus allows multipulse measuring principles which, despite the continuous rotational movement, have the same lateral resolution as a single-pulse system. In particular, no pulse energy or measuring time is lost. The principle is basically applicable for biaxial as well as coaxial macroscanners.

Although the present invention has been described primarily with reference to specific exemplary embodiments, it is in no way limited thereto. Those skilled in the art will therefore appropriately modify the described features and combine them with one another without departing from the core of the present invention. In particular, the methods, in each case described separately herein, may also be arbitrarily combined with one another.

What is claimed is:

1. A multipulse LIDAR system for detecting objects in an observation area, comprising:
    a transmitting device including at least one laser source configured to generate a transmission laser beam from a temporal sequence of single laser pulses, each of the single laser pulses illuminating a detection area that is limited to a portion of the observation area and samples at least one sampling point;
    a receiving device having a detection surface, including a linear or matrix subdetector system made up of multiple subdetectors adjacently situated in a first direction of extension, the receiving device being configured to receive the transmission laser beam, in the form of a reception laser beam, that is reflected and/or scattered on objects in the observation area of the multipulse LIDAR system, the receiving device being configured to image the sampling point, detected by the transmission laser beam, on the detection surface in the form of a pixel;
    a scanning device configured to generate a scanning movement of the transmission laser beam in a scanning direction for successive sampling of the entire observation area along successive multiple sampling points situated in succession in the scanning direction, the scanning movement of the transmission laser beam, for the single laser pulses in chronological succession, being configured to image the pixel on the detection surface, in each case shifted along the linear or matrix subdetector system; and
    a control device configured to determine distance information of the sampling points based on propagation times of the single laser pulses, the control device being configured to group subdetectors, which are detected from the pixel that is instantaneously imaged on the detection surface, to form a macropixel that is individually associated with the pixel, for shared evaluation;
    wherein the transmitting device includes multiple laser sources whose detection areas are mutually orthogonal with respect to the scanning direction, the detection surface for each of the laser sources including a subdetector system that is individually associated with the laser source, the subdetector systems being mutually orthogonal with respect to the scanning direction.

2. The multipulse LIDAR system as recited in claim 1, wherein the control device is also configured to adapt the position of the macropixel on the detection surface by regrouping corresponding subdetectors subsequent to the shift, caused by the scanning movement, of the pixel associated with the macropixel on the detection surface.

3. The multipulse LIDAR system as recited in claim 1, wherein:
    the transmitting device is configured to generate the transmission laser beam in such a way that the single laser pulses each illuminate a solid angle with at least two sampling points,
    the receiving device is configured to represent the two sampling points in the sampling range, simultaneously illuminated by the transmission laser beam, in the form of two pixels that are adjacently situated on the detection surface and that are shifted along the linear or matrix subdetector system due to the scanning movement; and
    the control device is configured to group subdetectors, instantaneously detected by a first pixel of the two pixels, together to form a first macropixel that is associated with the first pixel, and to group subdetectors, instantaneously detected by a second pixel of the two pixels, together to form a second macropixel that is associated with the second pixel.

4. The multipulse LIDAR system as recited in claim 3, wherein the control device is configured to associate the subdetectors, which are detected by the first pixel in a first individual measurement that takes place using a first single laser pulse, and by the second pixel in a second individual measurement that takes place using a second single laser pulse immediately following the first single laser pulse, with the first macropixel for the first individual measurement, and with the second macropixel for the subsequent second individual measurement.

5. A method for multidimensional detection of objects in an observation area using a multipulse LIDAR system, the method comprising:

generating a transmission laser beam, via a transmitting device, in the form of a temporal sequence of single laser pulses, the transmission laser beam with each of the single laser pulses illuminating a detection area that is limited to a subsection of the observation area and that samples at least one sampling point;

generating a scanning movement of the transmission laser beam in a scanning direction, resulting in successive sampling of the entire observation area at multiple successive sampling points in the scanning direction;

receiving a reception laser beam, generated by reflection and/or scattering of the transmission laser beam on objects in the observation area, on a detection surface that includes a linear or matrix subdetector system made up of multiple subdetectors adjacently situated in a first direction of extension, the sampling point on the detection surface, instantaneously detected by the transmission laser beam, being imaged in the form of a pixel that is successively shifted along the linear or matrix subdetector system due to the scanning movement of the transmission laser beam;

grouping subdetectors whose positions correspond to the instantaneous position of the pixel to form a macropixel that is individually associated with the pixel; and jointly evaluating the subdetectors associated with the macropixel;

wherein the transmitting device includes multiple laser sources whose detection areas are mutually orthogonal with respect to the scanning direction, the detection surface for each of the laser sources including a subdetector system that is individually associated with the laser source, the subdetector systems being mutually orthogonal with respect to the scanning direction.

6. The method as recited in claim 5, wherein signals, measured in multiple individual measurements for the macropixel, of the subdetectors associated with the macropixel in the individual measurements, are jointly associated with a histogram that is associated with the macropixel.

7. The method as recited in claim 5, wherein a position of a macropixel on the detection surface is successively adapted by regrouping corresponding subdetectors subsequent to a shift of the pixel on the detection surface, associated with the macropixel, that is caused by the scanning movement.

8. The method as recited in claim 5, wherein multiple sampling points are simultaneously detected during an individual measurement, subdetectors that are detected by a first pixel that is generated by a first sampling point on the detection surface being associated with a first macropixel that is individually associated with the first sampling point, and subdetectors that are detected by a second pixel that is formed by a second sampling point on the detection surface being associated with a second macropixel that is individually associated with the second sampling point.

9. A method for multidimensional detection of objects in an observation area using a multipulse LIDAR system, the method comprising:

generating a transmission laser beam, via a transmitting device, in the form of a temporal sequence of single laser pulses, the transmission laser beam with each of the single laser pulses illuminating a detection area that is limited to a subsection of the observation area and that samples at least one sampling point;

generating a scanning movement of the transmission laser beam in a scanning direction, resulting in successive sampling of the entire observation area at multiple successive sampling points in the scanning direction;

receiving a reception laser beam, generated by reflection and/or scattering of the transmission laser beam on objects in the observation area, on a detection surface that includes a linear or matrix subdetector system made up of multiple subdetectors adjacently situated in a first direction of extension, the sampling point on the detection surface, instantaneously detected by the transmission laser beam, being imaged in the form of a pixel that is successively shifted along the linear or matrix subdetector system due to the scanning movement of the transmission laser beam;

grouping subdetectors whose positions correspond to the instantaneous position of the pixel to form a macropixel that is individually associated with the pixel; and jointly evaluating the subdetectors associated with the macropixel;

wherein multiple sampling points are simultaneously detected during an individual measurement, subdetectors that are detected by a first pixel that is generated by a first sampling point on the detection surface being associated with a first macropixel that is individually associated with the first sampling point, and subdetectors that are detected by a second pixel that is formed by a second sampling point on the detection surface being associated with a second macropixel that is individually associated with the second sampling point, and wherein subdetectors that are detected by the first pixel during a first individual measurement and detected by the second pixel in a second individual measurement that takes place using a second single laser pulse immediately following the first single laser pulse are associated with the first macropixel for the first individual measurement, and with the second macropixel for the subsequent second individual measurement.

* * * * *